(12) United States Patent
Chen

(10) Patent No.: US 6,377,019 B1
(45) Date of Patent: Apr. 23, 2002

(54) PEAK TORQUE PER AMPERE METHOD FOR INDUCTION MOTOR VECTOR CONTROL

(75) Inventor: Li Chen, Livonia, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/499,366

(22) Filed: Feb. 10, 2000

(51) Int. Cl.[7] ............................................. H02P 7/628
(52) U.S. Cl. ...................... 318/807; 318/803; 318/805; 318/808; 318/809; 318/798
(58) Field of Search .................... 318/807, 803, 318/805, 808, 809, 798

(56) References Cited

U.S. PATENT DOCUMENTS

| | | | |
|---|---|---|---|
| 3,753,060 A | * 8/1973 | Greenwell | .................. 318/138 |
| 4,447,787 A | 5/1984 | Schwesig et al. | |
| 4,777,422 A | 10/1988 | Slicker et al. | |
| 4,926,105 A | * 5/1990 | Mischenko et al. | ......... 318/800 |
| 5,498,945 A | 3/1996 | Prakash | |
| 5,589,754 A | 12/1996 | Heikkila | |
| 5,600,215 A | * 2/1997 | Yamada et al. | ............. 318/139 |
| 5,719,482 A | 2/1998 | Kunzel | |
| 5,739,664 A | * 4/1998 | Deng et al. | ................. 318/808 |

* cited by examiner

Primary Examiner—Karen Masih
(74) Attorney, Agent, or Firm—Karl A. Vick

(57) ABSTRACT

An induction motor control system (10) for electric vehicles having a DC power supply (14), an inverter (16), an induction motor (12), a motor controller (26) and a vehicle-level controller (32). The method and system of the present invention optimizes the torque output for the induction motor and utilizes minimum power. The method and system of the present invention calculates the flux current such that the slip frequency is maintained at a nominal level, thereby producing peak torque.

4 Claims, 1 Drawing Sheet

$$\text{FLUX CURRENT} = \frac{\text{ROTOR RESISTANCE} * \text{TORQUE CURRENT}}{\text{ROTOR INDUCTANCE} * \text{SLIP FREQUENCY}}$$
FIG. 1
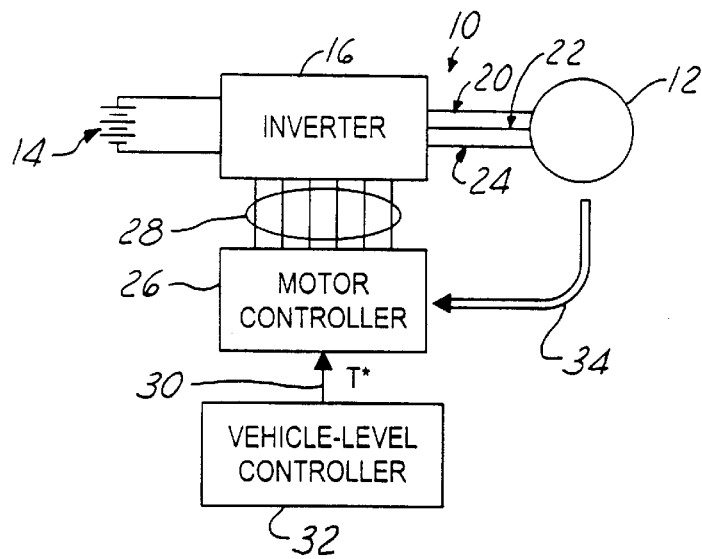
FIG. 2
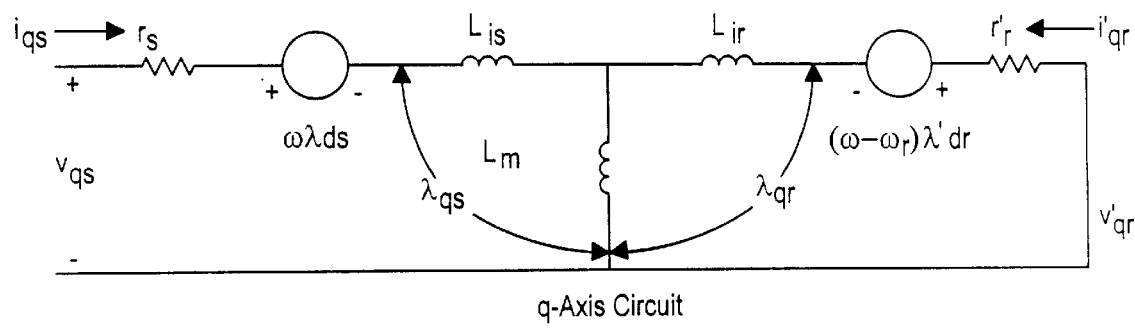
q-Axis Circuit
FIG. 3
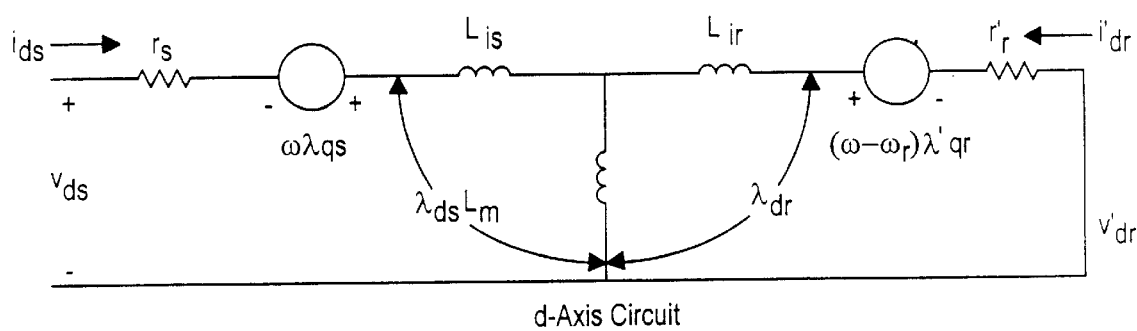
d-Axis Circuit
FIG. 4

PEAK TORQUE PER AMPERE METHOD FOR INDUCTION MOTOR VECTOR CONTROL

TECHNICAL FIELD

The present invention relates generally to induction motor control, and more particularly to vector control of induction motors.

BACKGROUND OF THE INVENTION

Control of induction motors can be performed by vector control, otherwise known as field-oriented control. Generally, in vector control of an induction motor, the electric currents in the phases of the motor (i.e., three phases in three-phase motor), are resolved into one "direct-axis" current, $i_d$, and one "quadrature-axis" current, $i_q$. The direct and quadrature axes reside in a synchronously rotating reference frame.

In vector control, rotor flux of the motor is a function of direct-axis current and is independent of quadrature axis current. Torque produced by the motor is generally a function of both direct-axis and quadrature-axis currents. Rotor flux is a function of only direct-axis current due to selection of the slip speed at which the rotor operates. Slip speed is defined as the difference in rotational speed between the rotor and the electromagnetic field in the stator of the motor. If the slip speed is properly selected, the motor is said to be "field-oriented" and the rotor flux along the quadrature axis is zero. In other words, all of the rotor flux is along the direct axis.

A vector controller chooses desired direct-axis and quadrature-axis currents such that the motor being controlled operates as desired, for example, with the desired torque and speed. Sometimes, in vector control of an induction motor, the controller will assume that the quadrature-axis and direct-axis currents should be equal. For some operating conditions, this assumption will produce good efficiency of the motor being controlled. The controller will then cause the desired quadrature-axis and direct-axis currents to be transformed into three phase currents. The three phase currents are the actual physical electric currents applied to the motor.

The assumption made by the controller that the direct-axis current should be equal to the quadrature-axis current is only a good assumption in certain situations and for certain operating conditions. Sometimes, where saturation of the core of the motor begins to set in, the efficiency resulting from equating quadrature-axis and direct axis currents begins to decrease.

It is known, to help assure high efficiency of an induction motor, to run the motor and measure the efficiency at which the motor is operating. Then, by trial and error, the direct-axis current is modified such that the efficiency of the motor is maintained at a maximum. However, this method is effective only for motors that operate in a few operating conditions. The trial and error approach is not as applicable where motors operate in varying conditions, such as in an electric-vehicle for example.

Typically, an induction motor drive provides three stages of operation. At low speeds, the voltage required by the motor is lower than the voltage capability of the inverter. The output torque is limited by the current capability of the inverter, which is independent of the speed. Accordingly, the first stage of operation below a base speed is often called the constant torque stage of operation. At a medium speed range, above the base speed, the maximum torque can only be achieved when the motor is operated at both voltage and current limits. In this stage, the maximum output torque is inversely proportional to the speed; hence it is called constant power stage. At high speeds, the voltage capability of the inverter is the primary limiting factor for the output torque. The maximum torque is inversely proportional to the square of the speed. It is referred to as the voltage limit stage.

The rotor resistance and the inductance are varied with current and temperature. When the slip frequency is at a nominal value, it produces peak torque at the lowest power. However, the slip frequency is not always at a nominal value. Therefore, it is possible that the flux current can supply too much current, which will overheat the motor. Likewise, it is also possible that the flux current can be too weak, in which case it is not possible to generate enough torque.

SUMMARY OF THE INVENTION

It is an object of the present invention to provide a method for efficient operation of an induction motor. It is another object of the present invention to maintain the flux current within predefined limits in order to optimize the motor output.

It is a further object of the present invention to anticipate the rotor flux for optimum motor output.

In carrying out the above objects and other objects and features of the present invention, a method is provided that achieves peak torque in the motor system at all times. The method of the present invention calculates the d-axis current as a function of a constant slip frequency.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 1 is a diagrammatic representation of the flux current formula according to the present invention;

FIG. 2 is a block diagram of the method of the present invention as it is applied to an induction motor and motor control system;

FIG. 3 is a circuit representation of the q-axis circuit; and

FIG. 4 is a circuit representation of the d-axis circuit.

DETAILED DESCRIPTION OF PREFERRED EMBODIMENTS

FIG. 1 depicts the method of the present invention, which calculates the flux current by keeping the slip frequency at a nominal, or predetermined, value. According to the method of the present invention, the motor system is operating at peak torque, and consuming the least amount of power by setting the flux current as a function of the rotor resistance, rotor inductance, and torque current, and maintaining an unchanging slip frequency.

FIG. 2 depicts an induction motor control system 10 used in an electric vehicle in which at least one of the vehicle's drive wheels is driven by an induction motor 12. A battery 14 provides a DC power source for the system. An inverter 16 has six switching devices, such as insulated-gate bipolar transistors, to switch the DC battery voltage to create pulse-width-modulated voltages in three phases 20, 22, and 24 of the induction motor 12. A motor controller 26 controls the switching of the switching devices within the inverter 16.

Switching signals 28 are passed from the motor controller 26 to the inverter 16 to effect the switching of the switching devices. A torque command 30 is issued to the motor controller 26 by a vehicle-level controller 32. The vehicle-level controller tracks vehicle-level variables such as accelerator pedal position, etc. and therefore, knows the amount of torque which the induction motor 12 should be commanded to produce.

Feedback signals 34 from the induction motor 12 to the motor controller 26 include such variables as actual currents in the phases 20, 22, and 24 and the rotational position or speed of the rotor of the induction motor 12. Preferably, the controls in the controller 26 rely upon software. However, it is to be understood that hardware and other types of controls can be used to practice the present invention.

The present invention involves the use of numerous mathematic manipulations of various quantities, the symbols for which, for purposes of convenience, are introduced in Table 1:

d=direct axis
q=quadrature axis
$V_{ds}$=stator voltage in direct axis
$V_{qs}$=stator voltage in quadrature axis
$r_s$=stator resistance
$r_r$=rotor resistance
$i_{ds}$=stator current direct axis
$i_{qs}$=stator current in quadrature axis
$i_{dr}$=rotor current in direct axis
$i_{qr}$=rotor current in quadrature axis
p=differential operator
ω=fundamental excitation frequency
$\lambda_{qs}$=stator flux in quadrature axis
$\lambda_{ds}$=stator flux in direct axis
$\lambda_{qr}$=rotor flux in quadrature axis
$\lambda_{dr}$=rotor flux in direct axis
$L_{ls}$=leakage inductance for stator
$L_{lr}$=leakage inductance for rotor
S=rotor slip
$S\omega_s$=rotor slip frequency Referring now to FIGS. 3 and 4, a background description will be provided for the preferred embodiment of the present invention. The stator current in an induction motor is oriented such that the stator current can be used to control the motor torque. It is known that the voltage, flux and current in an induction motor are vector quantities reflecting their spatial relationships. These quantities can be described in a two dimensional coordinate system. The two axes commonly used in this application of a two-dimensional coordinate system are referred to as the "direct", or "d" axis and the quadrature, or "q" axis. In order to express the vector quantities of the machine in terms of DC quantities instead of sinusoidally varying AC values, it is common to let the "d-q" coordinate system rotate at the stator frequency. This is referred to as a synchronously rotating coordinate system, in contrast to a stationary coordinate system.

The d-q model is given in FIGS. 3 and 4. Voltage loop equations for this circuit are given as equations (1)–(4) below:

$$V_{ds}=r_s i_{ds}+p\lambda_{ds}-\omega_s \lambda_{qs} \tag{1}$$

$$V_{qs}=r_s i_{qs}+p\lambda_{qs}+\omega_s \lambda_{ds} \tag{2}$$

$$0=r_r i_{dr}+p\lambda_{dr}-S\omega_s \lambda_{qr} \tag{3}$$

$$0=r_r i_{qr}+p\lambda_{qr}+S\omega_s \lambda_{dr} \tag{4}$$

The motor flux relationships, given by the following equations (5)–(8) can also be determined from the d-q model circuit and are as follows:

$$\lambda_{ds}=L_{ls}i_{ds}+L_m(i_{ds}+i_{dr}) \tag{5}$$

$$\lambda_{qs}=L_{ls}i_{qs}+L_m(i_{qs}+i_{qr}) \tag{6}$$

$$\lambda_{dr}=L_{lr}i_{dr}+L_m(i_{ds}+i_{dr}) \tag{7}$$

$$\lambda_{qs}=L_{lr}i_{qs}+L_m(i_{qs}+i_{qr}) \tag{8}$$

Vector control is accomplished if the angle of the axes of the d-q coordinate system are oriented such that all of the rotor flux lies in the d-axis. If this is done, no rotor flux will lie in the q-axis and the term $\lambda_{qr}$ will be equal to zero. Now from equations (3) and (4) above, become:

$$0=r_r i_{qr}+p\lambda_{dr} \tag{9}$$

$$0=r_r i_{qr}+S\omega_s \lambda_{dr} \tag{10}$$

and since the term $\lambda_{qr}$ has been forced to zero, the rotor current in the quadrature axis can be represented by:

$$i_{qr}=-(L_m/L_r)*i_{qs} \tag{11}$$

where $$L_r=L_m+L_{lr} \tag{12}$$

It follows from equation (10) that the slip relation is:

$$S\omega_s=-(r_r i_{qr})/\lambda_{dr} \tag{13}$$

and by using equations (12) and (13), it follows:

$$S\omega_S=(L_m r_r i_{qs})/(L_r \lambda_{dr}) \tag{14}$$

It is known that the rotor flux is given by:

$$\lambda_{dr}=L_m i_{ds} \tag{15}$$

and by combining equations (14) and (15), it follows that:

$$S\omega_s=(r_r/L_r)*(i_{qs}/S\omega_s) \tag{16}$$

The flux current, ids can be calculated as:

$$i_{ds}=(r_r/L_r)*(i_{qs}/S\omega_s) \tag{17}$$

The flux current is a function of the rotor resistance and the torque current divided by the rotor inductance and the slip frequency. The slip frequency is always nominal and therefore produces peak power at all times. The rotor resistance and inductance are varied with current and temperature.

According to the present invention, the flux current will not supply too much current, which overheats the motor, nor will it supply too little current, which produces weak flux. According to the present invention, the flux current is set such that the slip frequency is not changing. The flux current is calculated based on the slip frequency such that peak torque is always provided in the motor system.

The invention covers all alternatives, modifications, and equivalents, as may be included within the spirit and scope of the appended claims.

What is claimed is:

1. A method for induction motor vector control system having a flux current and a slip frequency, said method comprising the steps of:

calculating said flux current as a function of rotor resistance, torque current, rotor inductance and slip frequency, whereby said slip frequency is maintained at a predetermined value; and setting said flux current equal to said calculated value thereby producing a peak torque in said induction motor.

2. The method as set forth in claim 1 wherein said step of setting a flux current further comprises the step of calculating said flux current according to the following equation:

flux current=Rotor Resistance*Torque Current/Rotor Inductance*Slip Frequency.

3. An induction motor control system comprising:

an induction motor having a flux current and a slip frequency;

a battery supply for providing power to said induction motor;

an inverter control for switching said battery supply thereby creating a pulsed voltage from said battery supply;

a vehicle level controller for calculating said flux current and maintaining a constant predetermined slip frequency in said induction motor; and a motor controller for operating said induction motor at a peak torque based on said calculated flux current.

4. The induction motor control system as claimed in claim 3 wherein said vehicle level controller calculates said flux current according to the following equation:

flux current=Rotor Resistance*Torque Current/Rotor Inductance*Slip Frequency.

* * * * *